United States Patent
Schmidt et al.

[11] Patent Number: 6,101,812
[45] Date of Patent: Aug. 15, 2000

[54] MOTOR BRAKE ARRANGEMENT FOR A TURBOCHARGED ENGINE

[75] Inventors: Erwin Schmidt, Baltmannsweiler; Siegfried Sumser, Stuttgart, both of Germany

[73] Assignee: DaimlerChrysler AG, Stuttgart, Germany

[21] Appl. No.: 08/897,412

[22] Filed: Jul. 21, 1997

[30] Foreign Application Priority Data

Jul. 26, 1996 [DE] Germany ............... 196 30 224

[51] Int. Cl.⁷ ............................................. F02B 37/18
[52] U.S. Cl. ............................................. 60/602
[58] Field of Search ............... 60/600, 601, 602, 60/603

[56] References Cited

U.S. PATENT DOCUMENTS 3,009,320  11/1961  Raymond .
3,591,959  7/1971   Kubis .
5,839,281  11/1998  Sumser et al. ............... 60/602

FOREIGN PATENT DOCUMENTS 28 24 598   12/1978  Germany .
35 04 456   1/1986   Germany .
36 10 131   8/1987   Germany .
4-246237    9/1992   Japan .
6-278595    10/1994  Japan .

*Primary Examiner*—Michael Koczo
*Attorney, Agent, or Firm*—Klaus J. Bach

[57] ABSTRACT

In a motor brake arrangement for an internal combustion engine including an exhaust gas turbocharger having a turbine, a compressor and an exhaust duct leading from the engine to the turbine, a shutoff valve is arranged in the exhaust duct upstream of the turbine and a bypass line is connected to the exhaust duct upstream of the shutoff valve and extends to the turbine to supply gas under pressure from the exhaust duct to the turbine adjacent the turbine wheel.

15 Claims, 3 Drawing Sheets

MOTOR BRAKE ARRANGEMENT FOR A TURBOCHARGED ENGINE

BACKGROUND OF THE INVENTION

The invention relates to a motor brake arrangement for an internal combustion engine with a compressor with an air intake duct leading to the engine and an exhaust duct connected to an exhaust gas turbine, and a cutoff valve disposed in the exhaust duct upstream of the compressor.

DE 28 24 598 C2 discloses a motor brake arrangement for an internal combustion engine with an exhaust gas turbocharger which includes a shut-off valve disposed in an exhaust gas duct between the engine and the turbine of a turbocharger. The cutoff valve is a rotary valve with a pivotable valve body whose axis extends normal to the exhaust gas duct. The cutoff valve has a normal open position wherein the exhaust gases are admitted to the turbine of the turbocharger in an uninhibited manner. In the closed position of the shut-off valve, a residual exhaust gas flow is still admitted to the turbine of the turbocharger whereby the turbine wheel of the turbine is kept at a minimum speed.

US Pat. No. 3,591,959 discloses a motor brake arrangement for an internal combustion engine with a shut-off valve by which a front and rear exhaust manifold of a six-cylinder engine can be blocked.

Both motor brake arrangements with exhaust gas shut-off valves arranged upstream of the turbocharger have the disadvantage that turbine power is reduced essentially to zero when the shut-off valve is closed. As a result, the turbocharger speed is also reduced so that the engine is not being charged during such periods. The braking energy that can be transferred to the air mass flow is therefore greatly limited by the reduced air flow. Accordingly, a high required braking power results in high temperature of the air discharged from the engine such that the temperature stresses of the engine are relatively high. During braking operation, there is, furthermore, a need for a high exhaust gas manifold pressure with such arrangements if a high braking power is needed whereby the problem of valve floating may occur. The exhaust gas pressure in the exhaust gas manifold may exceed the closing force of the exhaust valves whereby the motor braking effectiveness is further reduced.

It is the object of the invention to provide a motor brake arrangement for an internal combustion engine with an exhaust gas turbocharger wherein the motor braking performance is increased with a relatively low temperature load of the motor and the exhaust system.

SUMMARY OF THE INVENTION

In a motor brake arrangement for an internal combustion engine including an exhaust gas turbocharger having a turbine, a compressor and an exhaust duct leading from the engine to the turbine, and a shutoff valve is arranged in the exhaust duct upstream of the turbine, a bypass line is connected to the exhaust duct upstream of the shutoff valve and extends to the turbine to supply gas under pressure from the exhaust duct to the turbine adjacent the turbine wheel.

A bypass line which branches off the exhaust pipe upstream of the exhaust gas cutoff valve and is connected to the turbine such that the exhaust gas is admitted adjacent a turbine wheel has the advantage that the air admitted to the turbine enters the turbine at a high flow speed such that the turbocharger speed remains relatively high. As a result, the air mass supplied to the engine at the intake side is substantially above ambient pressure and is relatively large providing for a relatively large air mass flow through the internal combustion engine. Consequently, a braking force can be generated which is at least as high as that achievable with state-of-the-art arrangements, but with lower temperature stresses for the engine and its exhaust gas system. Tests with such an arrangement have shown that because of the compressed air, the achievable braking power is even noticeably increased.

In a preferred embodiment of the invention, the bypass line is connected to a nozzle structure through which the air masses are supplied to the turbine flow passages just ahead of the turbine wheel. The nozzle structure includes preferable Venturi-type nozzles, whereby the speed of the air ahead of the turbine wheel can be increased to more than the speed of sound. The cross-section determining the air mass flow through a by-pass line is then the smallest cross-section of the Venturi nozzle. If the shut-off valve is opened, the major part of the air will flow through the substantially larger spiral air admission channel into the normal radial turbine flow admission passages. During braking operation, however, when the shut-off valve is closed and the air is conducted through the by-pass line, the air flow is accelerated resulting in an increased spin of the air admitted to the turbine and an increased turbine speed so that the air mass flow through the compressor and the air mass flow to the engine is increased. This results in a reduction of the temperature of the air whereby the braking power can be increased.

In a further advantageous embodiment of the invention, the heat shield arranged adjacent the turbine wheel includes the Venturi nozzle structure. This provides for a simple design arrangement and an effective admission of the air mass flow. The bypass line is then preferably in communication with a collection chamber arranged adjacent the axial end face of the turbine wheel from where the air masses are, evenly distributed, directed onto the turbine wheel through the nozzles of the nozzle structure.

In another advantageous embodiment of the invention, the bypass line supplies the air mass to a radial annular channel formed in the turbine housing through a nozzle arranged at an end of a divider wall of the turbine housing. This arrangement relates to a turbine with several flow passages particularly to radial turbines with two admission flow passages. With such an arrangement, the air masses can be admitted to the turbine closely ahead of the turbine wheel in an evenly distributed manner whereby a high turbine efficiency can be achieved.

In another advantageous embodiment of the invention, a divider wall of a radial turbine with at least two admission flow passages includes divider wall passages which are in communication each with an air admission nozzle. Alternatively, the divider wall may include an annular chamber from which the various nozzles extend. Either arrangement is relatively simple and inexpensive for supplying the air masses to the turbine ahead of the turbine wheel.

In another advantageous embodiment of the invention, the divider wall passage or passages and the annular chamber or chambers become narrower toward their inner end from where the nozzle passages extend which have their smallest cross-section adjacent the nozzle openings. In this way, the air can be admitted to the turbine with a large spin, particularly if the nozzle passages extend tangentially with respect to the turbine wheel. The air mass flow is admitted preferably by way of narrow passages. The air is under high pressure and therefore exits the nozzles ahead of the turbine wheel with a high flow speed. With pressures, which may be above 50 bar, the air flow speed in the air supply lines may be relatively small and therefore without losses. Because of the relatively high pressure, the air flow reaches speeds in excess of the speed of sound in the expansion portions of the nozzle just ahead of the turbine wheel and, consequently, relatively high turbine power outputs even with relatively small turbine efficiencies. In this operating mode, the turbine may operate as a pure impulse turbine, like the Pelton homogeneous pressure turbine. Alternatively, with single nozzles or separate admission passages for the air masses to the various nozzles, a high partial loading is possible. This can be controlled by the ignition sequence of the engine or, respectively, the opening of the control valves in the cylinders assigned to various nozzle openings such that there is a phased admission of air to the various nozzles.

Such a coordination of the air admission may be determined for the respective cylinders by a time switching which is most effective with respect to efficiency. In such an arrangement, pressure pulses may be supplied to nozzles distributed over the circumference of the turbine in a sequenced fashion or the air may be supplied to various nozzles in a mixed fashion.

In another advantageous embodiment of the invention, the nozzle passage and the nozzle opening is arranged at a relatively narrow angle with respect to a circumferential direction of the turbine wheel. If air is then also supplied to the air admission passages of the turbine and to the nozzles in the divider wall, the flow angles may become almost identical since the air admitted through the admission passages of the turbine is accelerated by the high flow speed of the air entering through the nozzles. This generates a high swirl component of the air flow entering the turbine providing for a relatively high turbine power output.

In another advantageous embodiment of the invention, the housing surrounding the turbine wheel includes several nozzle openings spaced circumferentially around the turbine wheel so that the air supply to the turbine is evenly distributed around the circumference of the turbine wheel. In this arrangement, the forces acting on the turbine wheel are evenly distributed whereby the load on the bearings disposed between the turbine wheel and the compressor wheel are relatively low.

The nozzle passages extend preferably essentially tangentially with respect to the turbine wheel. This results in a high-spin air inflow into the turbine whereby the turbine power output is increased and a high air mass flow can be achieved.

In still another embodiment of the invention, the exhaust gas shut-off valve and at least the branch-off for the bypass line are integrated with the turbine housing. In this way, the number of building components can be reduced. It also reduces the time required for assembly since the installation of the shutoff valve and the branch-off line in the exhaust gas line is eliminated.

Further details of the invention will be described below on the basis of the accompanying drawings:

DESCRIPTION OF PREFERRED EMBODIMENTS

Figure 1:
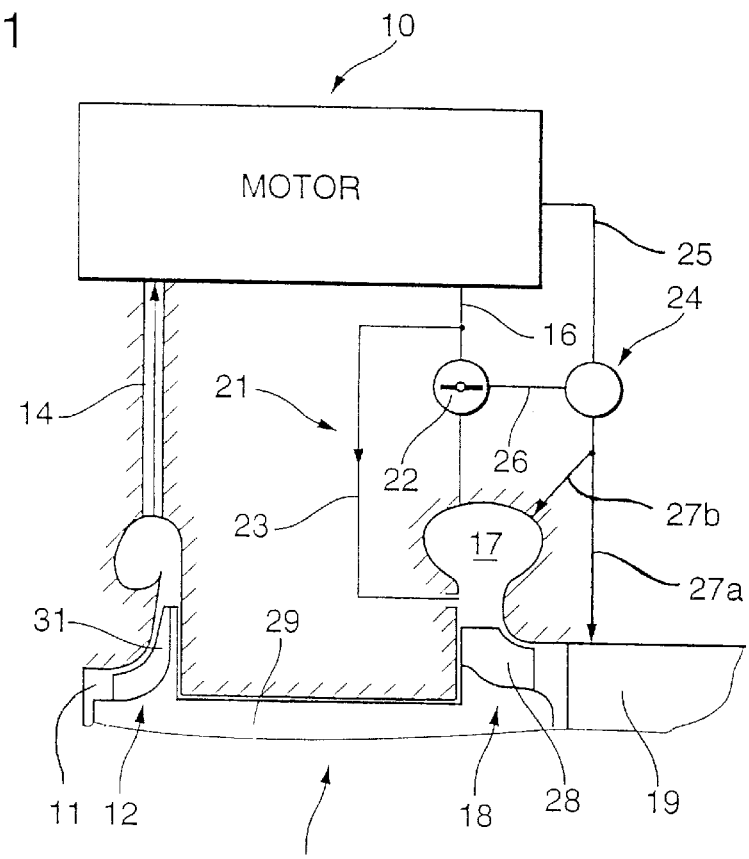
FIG. 1 is a schematic representation of a motor brake arrangement according to the invention.

FIG. 1 shows schematically an engine 10 of a multi-cylinder internal combustion engine with an air intake 11 through which air is admitted to a compressor 12 of an exhaust gas turbocharger 13. The air is compressed in the compressor 12 and supplied, by way of a pressure line 14, from the compressor to the combustion chambers of the engine 10. At the exhaust side of the engine, there is a first exhaust duct 16 which leads to a flow passage 17 of a turbine 18 of the turbocharger 13. By way of a second exhaust duct 19 downstream of the turbine 18, the exhaust gas is discharged to the environment after passing through an exhaust gas cleaning device (not shown).

At its exhaust side, the engine 10 includes a motor brake arrangement 21 comprising a shut-off valve 22 and a bypass line 23 branching off the exhaust duct 16 upstream of the shutoff valve 22. Parallel to the shutoff valve 22, there is a pressure release valve 24 which is coupled with a first communication line 26 and is controlled by way of a control line 25. Depending on the desired braking power, the pressure release valve 24, which is a flow control valve permitting accurate air mass flow control, is opened to the desired degree. The pressure release valve 24 also provides for overload protection. At a predetermined maximum pressure behind the exhaust valves, the pressure release valve 24 is controlled to open. The duct 27a downstream of the pressure release valve 24 leads to the exhaust duct 19. Alternatively, a duct 27b could be provided which leads to the turbine inlet flow passage 17. The shutoff valve 22 may be a flap-type valve, preferably a butterfly valve. The flow cross-section of the valve 22 corresponds to the cross-section of the exhaust gas duct 1 so that the exhaust gas duct 16 can be fully closed during braking operation. During such periods, a high exhaust gas pressure is generated in front of the shutoff valve 22. The blocked air then flows through the bypass line 23 which leads to the turbine flow passage 17 adjacent the turbine wheel 28. As a result, the turbine wheel speed can be maintained whereby the compressor wheel 31 coupled with the turbine wheel 28 by a shaft 29, compresses the intake air and supplies the compressed air to the engine 10. Consequently, the system provides for a relatively high air mass flow whereby the temperature of the air downstream of the engine 10 can be maintained at relatively low values.

The pressure release valve 24, which is in communication with the shutoff valve 22 is a dosing- and also an overpressure release valve. It is therefore possible to limit the maximum back-up pressure upstream of the shutoff valve 22. Such a pressure limitation has the advantage that the pressures are under control and excess pressures are released. In addition such an overpressure release and control valve permits an increase of the charge pressure at low engine speeds. By an intelligent control of the pressure release (shut off) valve, the braking characteristics of the engine can be advantageously influenced. The shutoff valve 22 preferably has a closed end position, which is adjustable for controlling the braking characteristics.

As soon as the back pressure at the shutoff valve becomes excessive, the pressure release valve 24 opens so that the air under pressure is released by way of the first and second communication lines 26, 27a, or 27b to the second exhaust duct 19 or the turbine flow passage 17.

Figure 2:
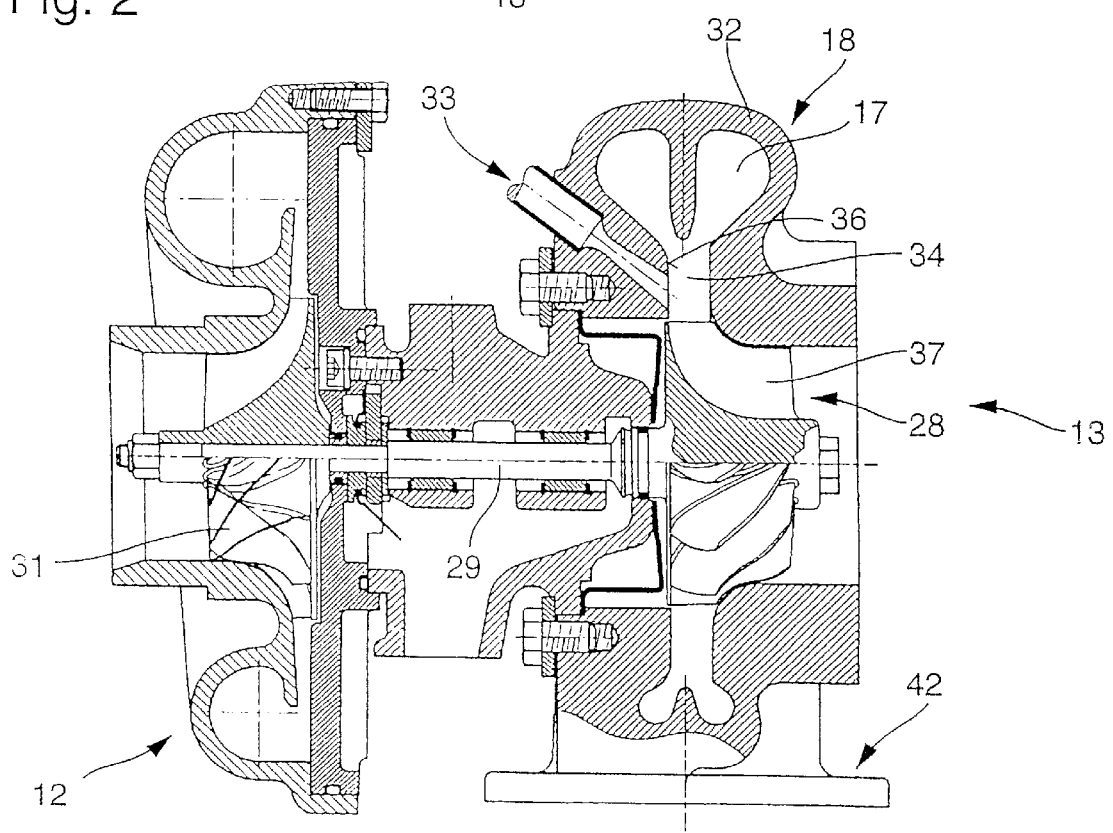
FIG. 2 is a schematic cross-sectional representation of an exhaust gas turbocharger with nozzles arranged in the turbine housing.

FIG. 2 is a schematic cross-sectional view of the exhaust gas turbocharger 13. The bypass line 23 extends to the nozzles 33 in the housing 32 of the turbine 18 which lead to a radial turbine flow passage 34 downstream of the spiral flow passages 17. The nozzle 33 is a venturi tube wherein the air masses admitted are accelerated and directed into the radial channel 34, which includes a guide vane structure 34a at the radially inner end of the separation wall. The nozzle opening 33 is—in contrast to the representation of FIG. 2—arranged at a small angle to the entrance surface 36 such that the air enters the radial channel 34 essentially in a tangential direction and impinges on the blades 37 of the turbine wheel 28. The nozzles 33 are arranged in the housing 32 preferably circumferentially evenly distributed.

The bypass line 23 includes a distributor (not shown) from which distribution lines extend to all nozzles 33 arranged in the housing 32. Alternatively, a guide vane structure may be arranged in the housing 32 instead of the nozzles 33, which may be, for example, 10° with respect to the entrance surface 36, the air is admitted to the turbine with a spin which provides for a relatively high turbine performance and turbine speed which again provides for a high air flow through the engine.

The nozzles 33 represent practically the brake gap corresponding essentially to the brake valve flap opening of predetermined value for acceptable limit engine back pressures referred to in the prior art. The sum of the nozzle opening cross-sections is in the order of a flap opening cross-section of the brake valve 22 as it is known from the prior art.

Figure 3:
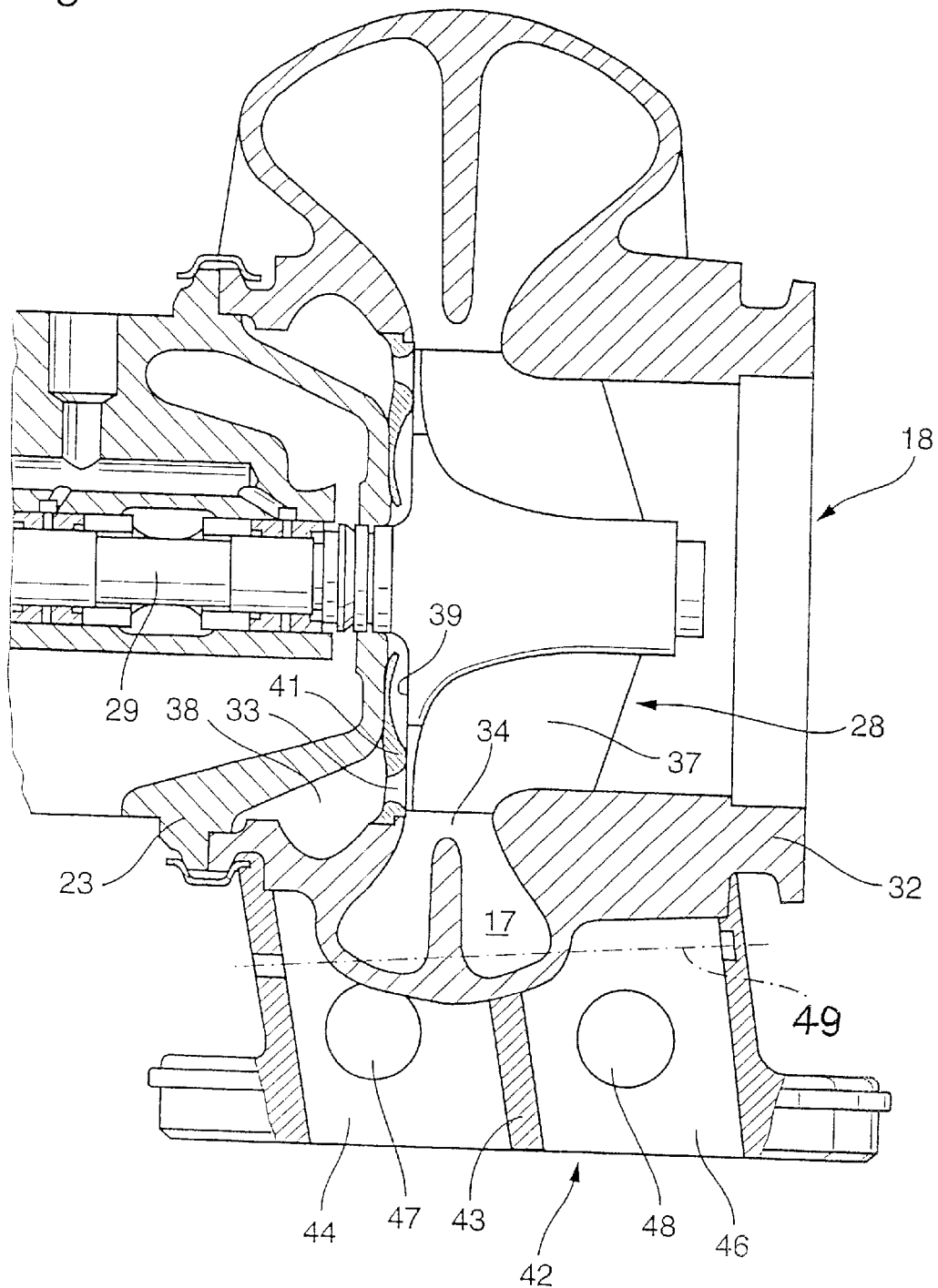
FIG. 3 shows an alternative embodiment with an annular air admission passage.

FIG. 3 shows an alternative embodiment wherein the bypass line 23 is connected to a circular admission chamber 38 which is disposed in the housing 32 behind the end wall 39 of the turbine wheel 28. The wall of the turbine housing separating the admission chamber 38 from the turbine wheel 28 includes a nozzle insert 41 with nozzles 33 evenly distributed over its circumference. Again, these nozzles 33 extend essentially tangentially with respect to th blades 37 of the turbine wheel 28 so that the air is admitted to the turbine with a spin.

The nozzle insert 41 is disposed within the heat shield as it is represented in FIG. 1 in an exemplary fashion. Such an arrangement is simple and inexpensive and it requires only a single bypass line connection to the admission chamber 38.

The turbine housing 32 as shown in FIG. 3 is for a 6-cylinder internal combustion engine. The housing 32 includes a stub 42 with a separation wall 43 whereby the air is guided to the flow passage 17 separately from a front exhaust manifold 44 and a rear exhaust manifold 46. The separation wall 43 improves the pulse charge effect of the engine.

The stub 42 preferably includes the shutoff valve 22, which in this case would be a double flap valve 49 for controlling the flow through the front and rear exhaust manifolds 44, 46. Through branchoffs 47,48 arranged upstream of the shutoff valve 22 (49), the air may flow by way of bypass line 23 to the admission chamber 38 when the shut off valve 22 is closed.

Such an integrated arrangement has the advantage that the shutoff valve structure 22 as well as the branchoffs 44, 46 for the upstream bypass lines 23 are disposed within the turbine housing 32. The arrangement has small space requirements and provides for a clean appearance.

An integrated arrangement with a shutoff valve 22 and bypass lines 23 disposed upstream of the shutoff valve 22 and in communication with the admission chamber 38 may also be provided for the embodiment as shown in FIG. 2. This arrangement may also include a stub 42 on the housing 32 of the turbine 18—as shown in FIG. 3—and the nozzles 33 may also be arranged in a nozzle insert 41.

Figure 4:
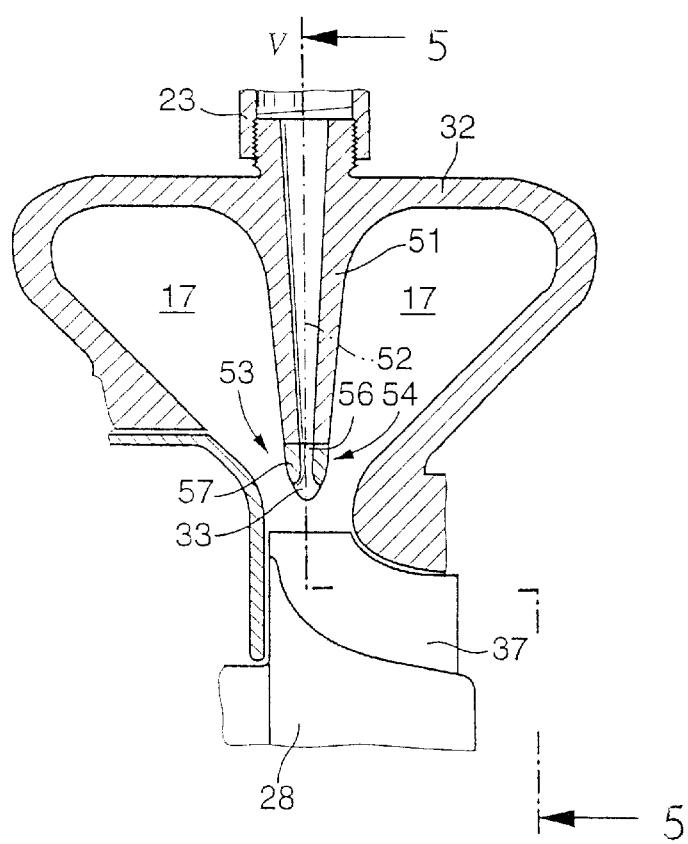
FIG. 4 shows an alternative embodiment of a turbine with two flow passages.
Figure 5:
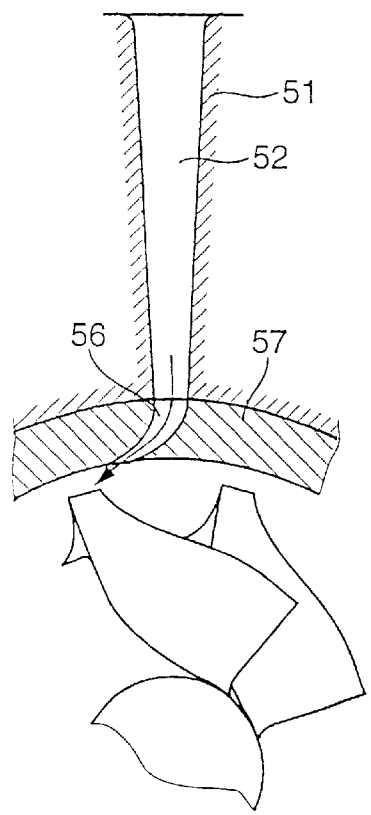
FIG. 5 is a view taken along line 5—5 of FIG. 4.

FIG. 4 is a schematic sectional view of a double flow passage exhaust gas turbocharger 13. The housing 32 includes a separation wall 51 separating the flow passages 17. The separation wall 51 includes a separation wall passage 52 to which a bypass line 23 is connected. A nozzle structure 54 is disposed at the free end 53 of the separation wall 51 adjacent the turbine wheel 28. The nozzle structure 54 includes a nozzle passage 56 disposed directly adjacent the separation wall passage 52 and having a nozzle opening 33 directed toward the turbine wheel 28. The nozzle opening 33 is arranged at a narrow angle toward the turbine wheel 28 as shown in FIG. 5. As a result, the air admitted by way of the bypass line 23 flows essentially tangentially into the radial channel 34 and onto the blades 37 of the turbine wheel 28.

The embodiment shown in FIGS. 4 and 5 includes a number of separation wall passages 52 distributed over the circumference of the housing 32 which, at the inner end 53 of the separation wall 51, are in communication with a nozzle ring 57 which includes nozzle openings 54 corresponding to the number of separation wall passages 52. The nozzle ring 57 is preferably a separate building component. Then the accurate manufacturing requirements regarding the nozzle ring 57 and nozzle passages 56 which have a strong influence on the performance of the turbine 18 can be easier and better accommodated. Alternatively however, the nozzle passages 56 and nozzle 33 may be formed in a single piece separation wall 51.

The bypass lines 23 have a small cross-section and furthermore, the cross-section of the bypass line 23 becomes continuously smaller in a downstream direction of the separation wall passage 52 and the nozzle passage 56 up to the nozzle 33. In this way, the flow speeds in the admission passages are, inspite of the relatively small flow cross-sections, relatively low, resulting in low losses. Nevertheless, as a result of the expansion area at the nozzle opening 33 adjacent the turbine wheel where the relatively high gas pressure is converted, supersonic air speeds are obtained which provide for a relatively high turbine power output even with a relatively low turbine efficiency.

Alternatively, instead of the nozzle ring 57, single nozzles 54 may be provided at the ends 53 of the respective passage 52 of the separation wall 51. Such an arrangement is advantageous if the turbine includes only a few nozzles distributed around the circumference of the turbine wheel.

Further, instead of one or several separation wall passages 52, an annular passage or chamber may be provided in the separation wall 51. Then the air can be admitted uniformly over the circumference of the separation wall 51 and, at the free inner end of the separation wall 51, there may be a nozzle ring with individual nozzles.

The nozzle ring 57, with nozzle openings 54 circumferentially distributed, may also be in the form of a guide vane structure forming the nozzle passages 56 (FIG.5) by which the air is guided under a narrow discharge angle into the radial ring channel 34 and onto the turbine wheel 28.

The embodiments shown in FIGS. 4 and 5 and also the alternative embodiments with an annular channel and a guide vane structure in the separation wall 51 may also be used with multi-passage exhaust gas turbocharger radial turbines. Also, dependent on the application, single nozzles 54, a nozzle ring 57 or other flow guide structure may be provided at the free inner end 53 of the separation wall 51 which includes separation wall passages 52 as well as an annular chamber. Such an additional air admission by way of the separation wall 51 adjacent the turbine wheel 28 into the radial channel 34 may be used especially with so-called turbo-brake-systems since this arrangement permits the reduction of excess temperatures.

A nozzle arrangement at the free end 53 of the separation wall 53 as described with reference to FIGS. 4 and 5, permits high loading of the internal combustion engine providing, for example during the braking phase, for a favorable energy loss behavior of the gas downstream of the cylinder up to the turbine wheel 28 for the conversion of energy within the turbine. The reason herefor is that the air needed by the compressor is in direct relation to the utilization of the energy provided by the internal combustion engine in the turbine 18 and consequently to the level of the braking performance achievable. In addition to its use for engine braking, the turbine arrangement according to the invention may also be used as acceleration boosting means.

Furthermore, there may be a high pressure passage adjacent the turbine wheel 28 by way of which water is injected to increase the braking power, for example, during emergency braking maneuvers. Also, the bypass lines 23 leading to the separation wall passage 52 may be arranged independently from relatively large volume exhaust manifolds so that the bypass lines 23 with relatively small cross-sections permit the well-controlled supply of certain fluids to the turbine 18 or to the subsequent converters and filters.

What is claimed is:

1. A motor brake arrangement for an internal combustion engine including an exhaust gas turbocharger having a turbine with a turbine wheel and two flow passages separated by a separation wall for guiding gas onto said turbine wheel, a compressor, an exhaust gas duct extending from said engine and through said turbine, a shut-off valve arranged in said exhaust gas duct upstream of said turbine and at least one bypass line connected to said exhaust gas upstream of said duct shutoff valve and extending to said turbine so as to supply gas under pressure from said exhaust gas duct to said turbine adjacent said turbine wheel through said flow passages, said separation wall including radial channels to which said bypass line is connected for supplying air under pressure thereto, said separation wall further including nozzles for directing said air from said radial channels onto said turbine wheel.

2. A motor brake arrangement according to claim 1, wherein said bypass line is connected to at least one nozzle directing the gas flow from said bypass line into said at least one flow passage upstream of said turbine wheel.

3. A motor brake arrangement according to claim 2, wherein said nozzles are arranged at an acute angle with respect to the gas flow entrance surface of said turbine.

4. A motor brake arrangement according to claim 3, wherein said nozzles are disposed in a nozzle insert mounted in said turbine housing.

5. A motor brake arrangement according to claim 1, wherein said separation wall includes an annular chamber in communication with said nozzles.

6. A motor brake arrangement according to claim 5, wherein a nozzle ring is disposed at the inner end of said separation wall and provided with nozzles for directing said onto said turbine wheel.

7. A motor brake arrangement according to claim 1, wherein said nozzles are disposed at the ends of said radial channels.

8. A motor brake arrangement according to claim 1, wherein a guide vane structure is disposed at the radially inner end of said separation wall.

9. A motor brake arrangement according to claim 1, wherein said radial channels become narrower toward said nozzles, the nozzles defining the smallest flow cross-sections.

10. A motor brake arrangement according to claim 2, wherein the sum of the cross-sections of the nozzle passages is about the same as a predetermined shutoff valve opening flow cross-section providing for an acceptable engine back pressure generated by the exhaust shut-off valve.

11. A motor brake arrangement according to claim 1, wherein at least said exhaust gas shutoff valve and said branch-off upstream of said shutoff valve for said bypass line are disposed in the housing of said turbine.

12. A motor brake arrangement according to claim 1, wherein at least said shutoff valve is in communication, by way of a connecting line, with a pressure release valve having a downstream connecting line leading to the exhaust gas duct downstream of said turbine.

13. A motor brake arrangement according to claim 12, wherein said pressure release valve is an over-pressure valve adjustable to the highest permissible back pressure ahead of said shutoff valve.

14. A motor brake arrangement according to claim 13, wherein said shutoff valve has a closed end position which is adjustable for controlling the braking characteristics.

15. A motor brake arrangement according to claim 1, wherein said exhaust duct is essentially fully blockable in a closed position of said shut-off valve.

* * * * *